US012775998B2

(12) United States Patent
Gupta et al.

(10) Patent No.: US 12,775,998 B2
(45) Date of Patent: Oct. 27, 2026

(54) SYSTEMS AND METHODS FOR SCENE RECONSTRUCTION USING A HIGH-SPEED IMAGING DEVICE

(71) Applicant: Wisconsin Alumni Research Foundation, Madison, WI (US)

(72) Inventors: Mohit Gupta, Madison, WI (US); Sacha Jungerman, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 431 days.

(21) Appl. No.: 18/360,801

(22) Filed: Jul. 27, 2023

(65) Prior Publication Data

US 2025/0037231 A1 Jan. 30, 2025

(51) Int. Cl.

| | |
|---|---|
| ***G06T 3/18*** | (2024.01) |
| ***G06T 3/14*** | (2024.01) |
| ***G06T 3/4038*** | (2024.01) |
| ***G06T 5/50*** | (2006.01) |
| ***G06T 5/73*** | (2024.01) |
| ***G06T 7/20*** | (2017.01) |

(52) U.S. Cl.

CPC .................. *G06T 3/18* (2024.01); *G06T 3/14* (2024.01); *G06T 3/4038* (2013.01); *G06T 5/50* (2013.01); *G06T 5/73* (2024.01); *G06T 7/20* (2013.01); *G06T 2207/20201* (2013.01); *G06T 2207/20221* (2013.01)

(58) Field of Classification Search

CPC ........... G06T 3/18; G06T 3/14; G06T 3/4038; G06T 5/50; G06T 5/73; G06T 7/20; G06T 2207/20201; G06T 2207/20221; G06T 2207/10016

USPC .......................................................... 382/284

See application file for complete search history.

(56) References Cited

U.S. PATENT DOCUMENTS

2010/0183071 A1* 7/2010 Segall .................... H04N 19/33 382/167

2014/0118402 A1* 5/2014 Gallo ........................ G06T 5/50 345/646

(Continued)

OTHER PUBLICATIONS

Brown et al., "Automatic Panoramic Image Stitching using Invariant Features", International Journal of Computer Vision 74(1), 59-73, 2007.

(Continued)

*Primary Examiner* — Jennifer Mehmood
*Assistant Examiner* — Dustin Bilodeau
(74) *Attorney, Agent, or Firm* — Andrus Intellectual Property Law, LLP

(57) ABSTRACT

Methods and systems for scene reconstruction are disclosed. The methods and systems include: receiving a set of frames for a scene, group the set of frames into multiple groups, merging multiple first and second frames in first and second initial groups of the multiple groups to generate first and merged frames, respectively, determining a homography across the first and second merged frames, and interpolating the homography to generate a warp to warp the set of frames. Then, the methods and system can repeat the grouping, the merging, the homography determining, and the interpolation. Then, the methods and system can provide a reconstructed image based on the warp of the set of frames. Other aspects, embodiments, and features are also claimed and described.

20 Claims, 12 Drawing Sheets

(56) References Cited

U.S. PATENT DOCUMENTS

| | | | | |
|---|---|---|---|---|
| 2021/0158593 | A1* | 5/2021 | Li | G06T 13/40 |
| 2023/0156339 | A1* | 5/2023 | Suri | G06V 10/80<br>348/36 |
| 2025/0008930 | A1* | 1/2025 | Holzman | G06V 20/52 |
| 2025/0104192 | A1* | 3/2025 | Li | G01S 7/4808 |

OTHER PUBLICATIONS

Ingle et al., "Passive Inter-Photon Imaging", In 2021 IEEE/CVF Conference on Computer Vision and Pattern Recognition (CVPR), pp. 8581-8591, Nashville, TN, USA, Jun. 2021. IEEE. 7.

Iwabuchi et al., "Image Quality Improvements Based on Motion-Based Deblurring for Single-Photon Imaging," IEEE Access, 9:30080-30094, 2021. Conference Name: IEEE Access. 2.

Ma et al., "Quanta Burst Photography," ACM Trans. Graph., vol. 39, No. 4, Article 79. Publication date: Jul. 2020.

Seets et al., "Motion Adaptive Deblurring with Single-Photon Cameras," arXiv:2012.07931v1 [eess.IV] Dec. 14, 2020.

Caspi et al., "Spatio-Temporal Alignment of Sequences", Dept. of Computer Science and Applied Math, The Weixmann Institute of Science, pp. 1-26, 2000.

International Preliminary Report on Patentability in PCT Application No. PCT/US2024/039871, mailed Feb. 5, 2026.

* cited by examiner

Low Noise, Low Blur (230 matches)

Low Noise, High Blur (16 matches)

High Noise, Low Blur (74 matches)

High Noise, High Blur (0 matches)

High Speed Camera

Sample Frame, Normal Light

Sample Frame, Bright Light

Reconstructed Panorama (500FPS, Bright Light)

SYSTEMS AND METHODS FOR SCENE RECONSTRUCTION USING A HIGH-SPEED IMAGING DEVICE

STATEMENT OF GOVERNMENT SUPPORT

This invention was made with government support under 1943149 and 2107060 awarded by the National Science Foundation. The government has certain rights in the invention.

CROSS-REFERENCE TO RELATED APPLICATION(S)

N/A

TECHNICAL FIELD

The technology discussed below relates to scene reconstruction.

BACKGROUND

Accurate recovery of motion from a sequence of images can be performed in computer vision with numerous applications (e.g., in robotics, augmented reality, user interfaces, and autonomous navigation). However, traditional scene reconstruction or motion estimation technique in such conditions suffer from too much blur in the presence of high-speed motion and/or strong noise in low-light conditions. As the demand for computer vision tasks continues to increase, research and development continue to advance motion estimation or scene reconstruction technologies to meet the growing demand for computer vision.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one example, a method, a system, and/or an apparatus for scene reconstruction is disclosed. The method, the system, and/or the apparatus includes: obtaining a set of frames for a scene: grouping the set of frames into a first initial group and a second initial group: determining a first homography across a first merged frame of the first initial group and a second merged frame of the second initial group: warping the set of frames according to the first homography: resampling the set of frames to generate a first new group and a second new group: determining a second homography across a third merged frame of the first new group and a fourth merged frame of the second new group: warping the set of frames according to the second homography; and providing a reconstructed image based on the warped set of frames.

In another example, a method, a system, and/or an apparatus for scene reconstruction is disclosed. The method, the system, and/or the apparatus includes: obtaining a set of frames for a scene: grouping the set of frames into a first initial group and a second initial group: warping and merge a plurality of first frames in the first initial group and a plurality of second frames in the second initial group to generate a first merged frame and a second merged frame, respectively: determining a first homography across the first merged frame and the second merged frame: warping the set of frames according to the first homography: resampling the set of warped frames to generate a first new group and a second new group: merging a plurality of third frames in the first new group and a plurality of fourth frames in the second new group to generate a third merged frame and a fourth merged frame, respectively: determining a second homography across the third merged frame and the fourth merged frame: warping the set of warped framed according to the second homography; and providing a reconstructed image based on the warp of the set of frames.

These and other aspects of the disclosure will become more fully understood upon a review of the drawings and the detailed description, which follows. Other aspects, features, and embodiments of the present disclosure will become apparent to those skilled in the art, upon reviewing the following description of specific, example embodiments of the present disclosure in conjunction with the accompanying figures. While features of the present disclosure may be discussed relative to certain embodiments and figures below; all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. Similarly, while example embodiments may be discussed below as devices, systems, or methods embodiments it should be understood that such example embodiments can be implemented in various devices, systems, and methods.

DETAILED DESCRIPTION

The detailed description set forth below in connection with the appended drawings is intended as a description of various configurations and is not intended to represent the only configurations in which the subject matter described herein may be practiced. The detailed description includes specific details to provide a thorough understanding of various embodiments of the present disclosure. However, it will be apparent to those skilled in the art that the various features, concepts and embodiments described herein may be implemented and practiced without these specific details. In some instances, well-known structures and components are shown in block diagram form to avoid obscuring such concepts.

Example Scene Reconstruction System

Figure 1:
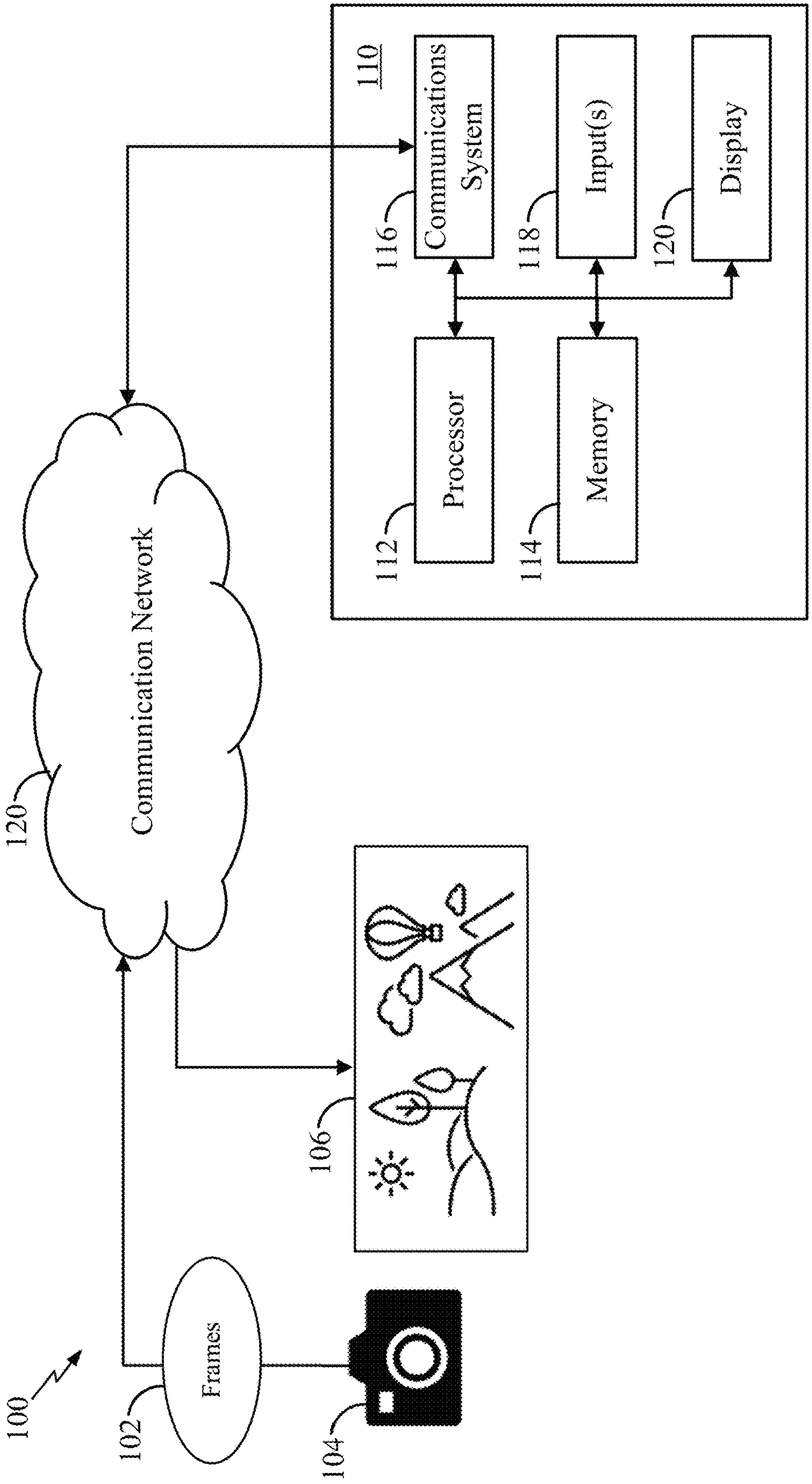
FIG. 1 is a block diagram conceptually illustrating a system for video recognition according to some embodiments.

FIG. 1 shows a block diagram illustrating a system for scene reconstruction according to some embodiments. In some examples, a computing device 110 can obtain a stream of frames 102 from an imaging device 104 and/or a system via the communication network 120, and produce a reconstructed image 106.

In some examples, the imaging device 104 can include a single-photon camera, a single-photon avalanche diode, a high-speed camera, or any suitable camera, which is capable of high-speed imaging. In some examples, the single-photon camera is a sensor technology with ultra-high sensitivity down to individual photons. In addition to its extreme sensitivity, the single-photon camera based on single-photon avalanche diodes (SPADs) can also record photon-arrival timestamps with extremely high (sub-nanosecond) time resolution. Moreover, the SPAD-based single-photon camera is compatible with complementary metal-oxide semiconductor (CMOS) photolithography processes which can facilitate fabrication of kilo-to-mega-pixel resolution SPAD arrays. Due to these characteristics, the SPAD-based single-photon camera can be used in 3D imaging, passive low-light imaging, HDR imaging, non-line-of-sight (NLOS) imaging, fluorescence lifetime imaging (FLIM) microscopy, and diffuse optical tomography.

Unlike a conventional camera pixel that outputs a single intensity value integrated over micro-to-millisecond timescales, a SPAD pixel generates an electrical pulse for each photon detection event. A time-to-digital conversion circuit converts each pulse into a timestamp recording the time-of-arrival of each photon. Under normal illumination conditions, a SPAD pixel can generate millions of photon timestamps per second. The photon timestamps are often captured with respect to a periodic synchronization signal generated by a pulsed laser source. To make this large volume of timestamp data more manageable, the SPAD-based single-photon camera can build a timing histogram on-chip instead of transferring the raw photon timestamps to the host computer. The histogram can record the number of photons as a function of the time delay with respect to the synchronization pulse.

In some examples, the computing device 110 can include a processor 112. In some embodiments, the processor 112 can be any suitable hardware processor or combination of processors, such as a central processing unit (CPU), a graphics processing unit (GPU), an application specific integrated circuit (ASIC), a field-programmable gate array (FPGA), a digital signal processor (DSP), a microcontroller (MCU), etc.

In further examples, the computing device 110 can further include a memory 114. The memory 114 can include any suitable storage device(s) that can be used to store suitable data (e.g., the stream of frames 102, a reconstructed image 106, etc.) and instructions that can be used, for example, by the processor 112 to obtain a set of frames for a scene: group the set of frames into a first initial group and a second initial group; warp and merge a plurality of first frames in the first initial group and a plurality of second frames in the second initial group to generate a first merged frame and a second merged frame, respectively: determine a first homography across the first merged frame and the second merged frame: warp the set of frames according to the first homography: resample the set of warped frames to generate a first new group and a second new group: merge a plurality of third frames in the first new group and a plurality of fourth frames in the second new group to generate a third merged frame and a fourth merged frame, respectively: determine a second homography across the third merged frame and the fourth merged frame: warp the set of warped framed according to the second homography; and provide a reconstructed image based on the warp of the set of frames; select a first middle frame in the first initial group to warp the plurality of first frames based on the first middle frame: select a second middle frame in the second initial group to warp the plurality of first frames based on the first middle frame: merge a plurality of first warped frames of the first initial group to generate the first merged frame: merge a plurality of second warped frames of the second initial group to generate the second merged frame: warp the first merged frame and the second merged frame to be aligned together before determining the second homography across the first merged frame and the second merged frame: interpolate the first homography: warp the set of frames based on the interpolated first homography. The memory 114 can include any suitable volatile memory, non-volatile memory, storage, or any suitable combination thereof. For example, memory 114 can include random access memory (RAM), read-only memory (ROM), electronically-erasable programmable read-only memory (EEPROM), one or more flash drives, one or more hard disks, one or more solid state drives, one or more optical drives, etc. In some embodiments, the processor 112 can execute at least a portion of process 300 described below in connection with FIG. 3.

In further examples, the computing device 110 can further include a communications system 116. The communications system 116 can include any suitable hardware, firmware, and/or software for communicating information over the communication network 120 and/or any other suitable communication networks. For example, the communications system 116 can include one or more transceivers, one or more communication chips and/or chip sets, etc. In a more particular example, communications system 116 can include hardware, firmware and/or software that can be used to establish a Wi-Fi connection, a Bluetooth connection, a cellular connection, an Ethernet connection, etc.

In further examples, the computing device 110 can receive or transmit information (e.g., a stream of frames 102, a reconstructed image 106, etc.) from or to any other suitable system over the communication network 120. In some examples, the communication network 120 can be any suitable communication network or combination of communication networks. For example, the communication network 120 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard, such as CDMA, GSM, LTE, LTE Advanced, NR, etc.), a wired network, etc. In some embodiments, communication network 120 can be a local area network, a wide area network, a public network (e.g., the Internet), a private or semi-private network (e.g., a corporate or university intranet), any other suitable type of network, or any suitable combination of networks. Communications links shown in FIG. 1 can each be any suitable communications link or combination of communications links, such as wired links, fiber optic links, Wi-Fi links, Bluetooth links, cellular links, etc.

In further examples, the computing device 110 can further include one or more inputs 118 and/or a display 120. In some embodiments, the input(s) 118 can include any suitable input devices (e.g., a keyboard, a mouse, a touchscreen, a microphone, etc.). In further embodiments, the display 120 can include any suitable display devices, such as a computer monitor, a touchscreen, a television, an infotainment screen, etc. to display the reconstructed image 106, or any suitable information.

Conventional Feature Matching Technique

Figure 2A:
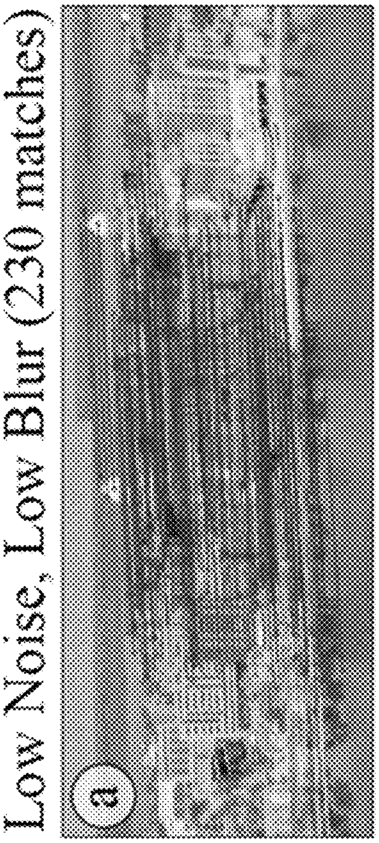
FIG. 2A Prior Art
FIG. 2A-2D illustrate conventional feature matching techniques.
Figure 2B:
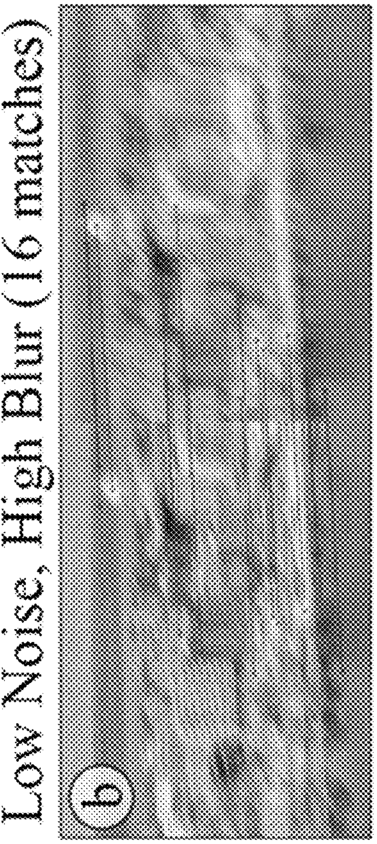
FIG. 2B Prior Art
Figure 2C:
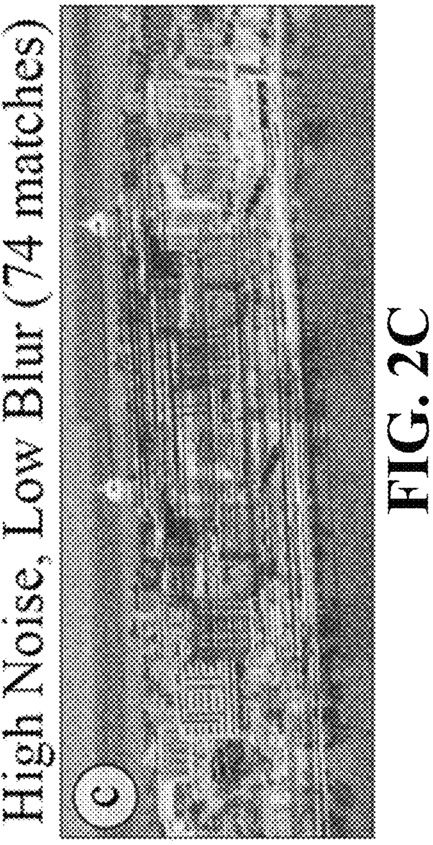
FIG. 2C Prior Art
Figure 2D:
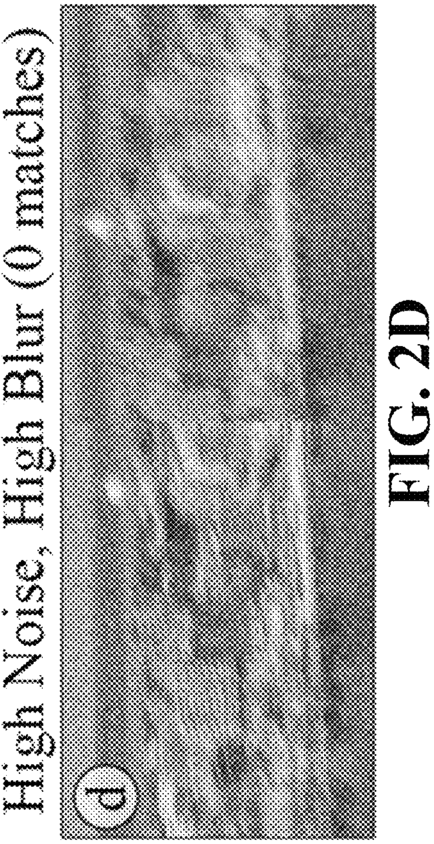
FIG. 2D Prior Art

FIGS. 2A-2D illustrate conventional feature matching techniques. In some scenarios, a series of images as the scene is captured by a camera, which undergoes motion. In ideal imaging conditions (sufficient light, relatively small motion), conventional motion estimation and registration techniques perform robustly. In FIG. 2A, a conventional feature matching technique is able to find reliable matches across images. However, in settings involving low-light (e.g., FIGS. 2C and 2D) and rapid motion (e.g., FIGS. 2B and 2D), the number of successful feature matches drop, resulting in erroneous motion estimation. This is due to the fundamental noise-vs-blur trade-off—the captured images either have strong noise or large motion blur, depending on the exposure length used, both of which prevent reliable feature detection and image registration (FIGS. 2B-2D). More generally, this trade-off limits the performance of several computer vision and imaging techniques that uses motion estimation across a sequence of images.

Example Scene Reconstruction Technique

In some examples, the disclosed scene reconstruction technique and system associated with FIGS. 1 and 3-10 can reconstruct a visual scene in the presence of high-speed motion and/or low illumination.

Figure 3A:
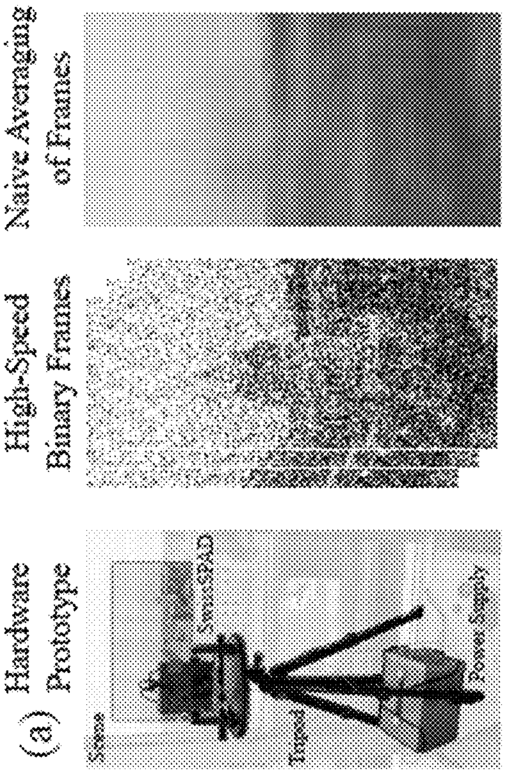
FIGS. 3A-3C illustrate an example scene reconstruction overview according to some embodiments.

Referring to FIG. 3A, the disclosed scene reconstruction technique and system can use a single-photon camera, which is capable of high-speed imaging in low-light conditions, particularly when used in association with the techniques disclosed herein. Single-photon cameras based on single-photon avalanche diode (SPAD) technology provide extreme sensitivity, are cheap to manufacture, and are increasingly becoming commonplace, recently getting deployed in consumer devices such as mobile devices. In some aspects, SPADs do not suffer from read-noise and enable captures at hundreds of thousands of frames per second even in extremely low flux, while being limited only by the fundamental photon noise. It should be appreciated that disclosed scene reconstruction technique and system is not limited to the single-photon camera. The disclosed scene reconstruction technique and system can be used to any other suitable camera (e.g., a high speed camera, a Complimentary Metal-Oxide Semiconductor (CMOS) camera, etc.).

Although single-photon cameras can capture scene information at high sensitivity and speed, each individual captured frame can be binary valued: a pixel is on if at least one photon is detected during the exposure time and off otherwise. This binary imaging model presents unique challenges. Traditional image registration techniques rely on feature-based matching, or direct optimization using differences between pixel intensities, both of which rely on image gradients to converge to a solution. Individual binary images suffer from severe noise and quantization (only having 1-bit worth of information per pixel), and are inherently non-differentiable, making it challenging, if not impossible, to apply conventional image registration and motion estimation techniques directly on binary frames. Aggregating sequences of binary frames over time increases signal (FIG. 3A) but comes at the cost of potentially severe motion blur, creating a fundamental noise-vs-blur tradeoff.

Figure 3B:
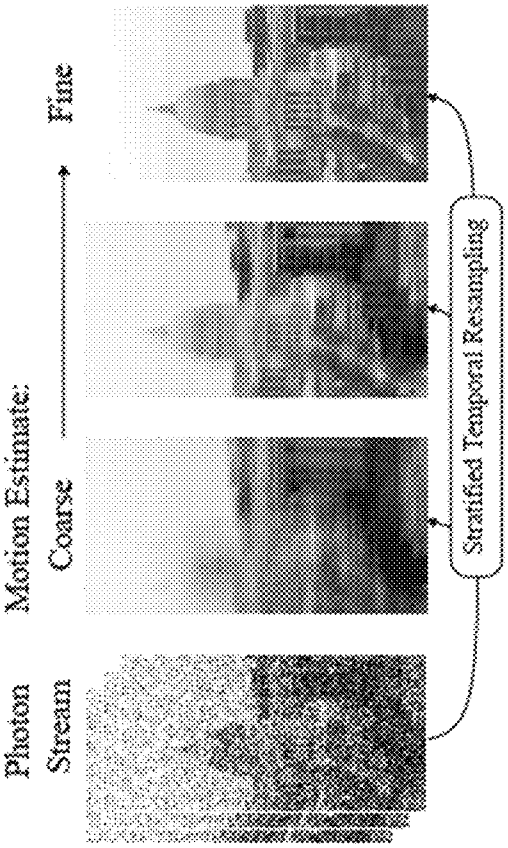

The disclosed scene reconstruction technique and system is capable of estimating rapid motion from a sequence of high-speed binary frames captured using an image device (e.g., a single-photon camera, a high-speed camera, a CMOS camera, etc.). In some examples, these binary frames can be aggregated in post-processing in a motion-aware manner so that more signal and bit-depth are collected, while simultaneously minimizing motion blur. As seen in FIG. 3B, the disclosed scene reconstruction technique and system iteratively improves the initial motion estimate, ultimately enabling scene reconstruction under rapid motion and low light and conditions. The disclosed scene reconstruction technique and system can be used to enhance one-shot local motion compensation and used in the recovery of global projective motion (homography). The disclosed scene reconstruction technique and system enables the capture of high-speed panoramas with super-resolution and high dynamic range capabilities. As shown in FIG. 1C, the disclosed scene reconstruction technique and system can reconstruct a high-quality panorama, captured in less than a second over a wide field-of-view, while simultaneously super-resolving details such as text from a long distance (~1300 m).

Example Scene Reconstruction Process

Figure 4:
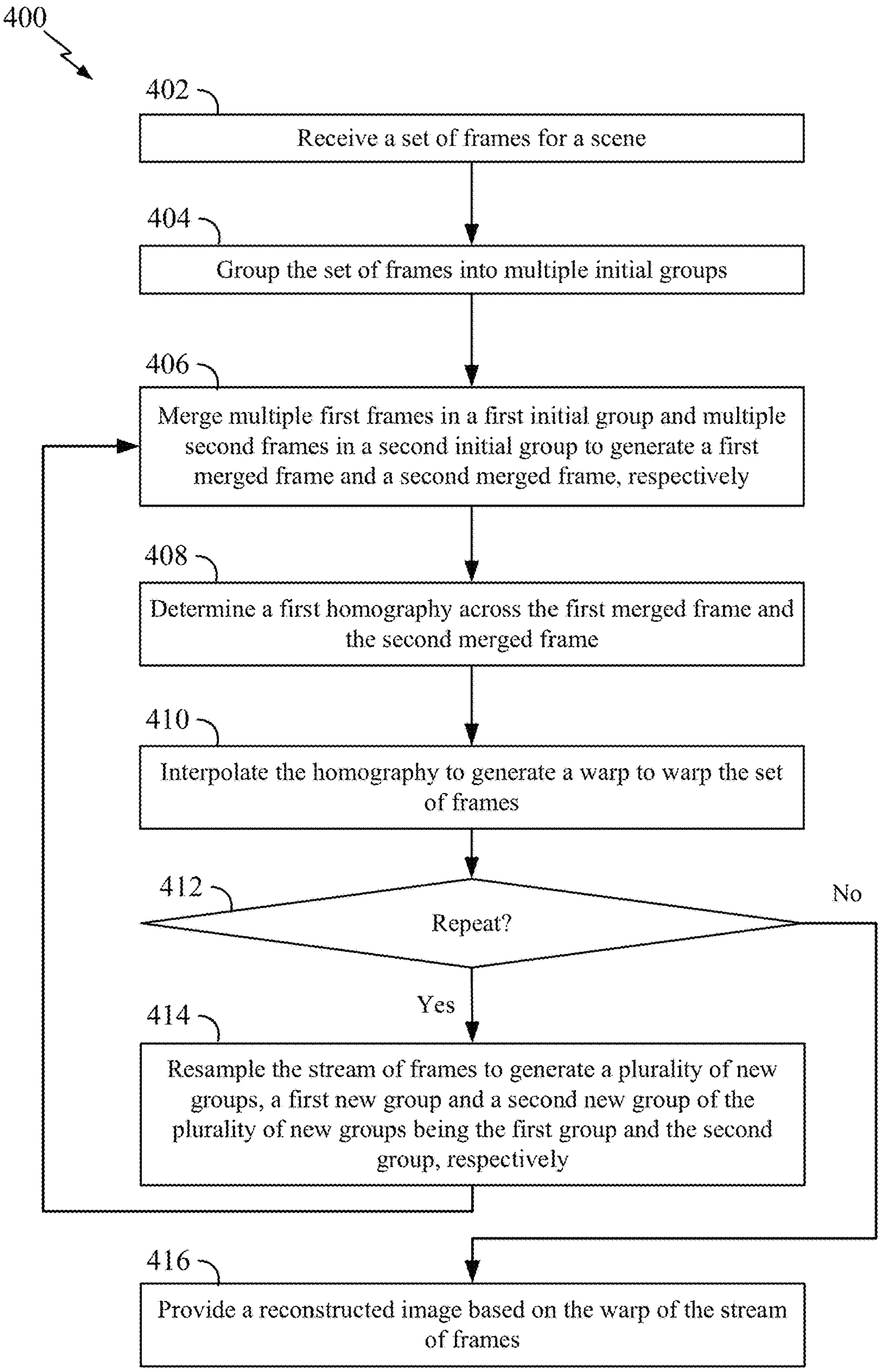
FIG. 4 is a flow diagram illustrating an example process for scene reconstruction according to some embodiments.

FIG. 4 is a flow diagram illustrating an example process 400 for scene reconstruction in accordance with some aspects of the present disclosure. As described below, a particular implementation can omit some or all illustrated features/steps, may be implemented in some embodiments in a different order, and may not require some illustrated features to implement all embodiments. In some examples, an apparatus (e.g., computing device 110, processor 112 with memory 114, etc.) in connection with FIG. 1 can be used to perform the example process 400. However, it should be appreciated that any suitable apparatus or means for carrying out the operations or features described below may perform the process 400.

At step 402, the process 400 obtains a set of frames for a scene. In some examples, the set of frames can be a stream of video frames (e.g., video frames). In other examples, the set of frames can be multiple image frames (e.g., captured by a camera). Further, the set of frames can be captured by an imaging device 104. For example, a user can move the imaging device 104 to capture a scene via the set of frames. In some examples, the imaging device can include a single-photon camera. However, it should be appreciated that the imaging device is not limited to a single-photon camera. For example, the imaging device can include a high-speed camera, which can capture images with frame rates in excess of 250 fps. In some examples, the single-photon camera is capable of high-speed imaging (e.g., 500 fps or higher) in low-light conditions. In further examples, the single-photon camera can be based on a single-photon avalanche diode (SPAD) sensor. In some examples, a frame of the set of frames can include binary values. For example, a pixel in the frame is one if at least one photon is detected during the exposure time and off otherwise. Thus, each pixel in the frame can include a binary value (i.e., 1-bit information). In further examples, the set of frames can be considered a three-dimensional photon cube (i.e., x and y spatial dimensions and an extra photon arrival time dimension).

In some examples, the image formation model for the SPAD sensor may enable high-speed photon-level sensing, which can emulate virtual exposures whose signal-to-noise ratio (SNR) is limited only by the fundamental limits of photon noise. For a static scene with a radiant flux (photons/second) of @, during an exposure time T, the probability of observing k incident photons on a SPAD camera pixel follows a Poisson distribution:

$$P(k) = \frac{(\phi\tau)^k e^{-\phi\tau}}{k!}. \tag{1}$$

After each photon detection, the SPAD pixel enters a dead time during which the pixel circuitry resets. During this dead time, the SPAD may not detect additional photons. The SPAD pixel output during this exposure t is binary-valued and follows a Bernoulli distribution given by:

$$P(k=0) = e^{-\phi\tau},\ \ P(k=1) = 1 - e^{-\phi\tau}. \tag{2}$$

In some examples, source of noise such as dark counts and non-ideal quantum efficiency can be absorbed into the value of ϕ.

In some examples, given n binary observations $B_i$ of a scene, a virtual exposure can be captured. In some examples, the virtual exposure can indicate aggregating the photon information (e.g., the set of frames). The virtual exposure can use the following maximum likelihood estimator:

$$\hat{\phi} = -\frac{1}{\tau}\ln\left(1 - \frac{1}{n}\sum_{i=1}^{n} B_i\right). \tag{3}$$

Different virtual exposures can be emulated by varying the starting index i and the number n of binary frames. The granularity and flexibility of these virtual exposures is limited only by the frame rate of the SPAD array, which reaches up to ~100 kfps, enabling robust motion estimation at extremely fine time scales. Furthermore, SPAD arrays have negligible read noise and quantization noise, leading to significantly higher SNR as compared to conventional images captured over the same exposures.

While the embodiments presented above are applicable to a wide range of motion models, the embodiment can be used for image homographies, which are a global motion model. In some examples, a modular technique can be used for homography estimation from photon cube data (i.e., the set of frames), which is capable of localizing high-speed motion even in ultra-low light settings. As an example application, a panorama image may be reconstructed from a photon cube (i.e., the set of frames) by using the homographies to warp binary frames onto a common reference frame. Given a temporal sequence of n binary frames $$\{B_i\}_{i=1}^{n},$$

, image homographies can be computed and iteratively refined. The resulting reconstruction can be made through the following steps:

- Re-sample (e.g., steps 404 and 414): Sample binary frames across the photon cube which will be merged together;
- Merge (e.g., step 406): Merge the sampled frames using the current per-frame homography estimate;
- Locate (e.g., step 408): Apply a motion estimation algorithm to the merged frames; and
- Interpolate (e.g., step 410): Interpolate the estimated homographies to the granularity of individual binary frames.

With successive iterations (e.g., step 412) of the above steps, the homography estimates are refined. Once convergence is reached, the per-frame estimated warps are used to assemble the final panorama (e.g., step 416).

At step 404, the process 400 groups the set of frames into multiple initial groups including a first initial group and a second initial group. For example, the process 400 may sample the set of frames (e.g., the sequence of binary frames) across the photon cube to be merged together. In some examples, the set of frames (e.g., the entire sequence of binary frames) is re-sampled and grouped into subsets that are later aligned and merged. In some examples, a frame in the middle of each group or subset (e.g., a midpoint sampling) can be used as the grouping strategy. For example, given a group size of m, during the first iteration, the n binary frames can be splitted into [n/m] non-overlapping groups. A single frame within each group can be chosen to be the reference frame whose warp is later estimated in the "Locate" phase (i.e., step 408). At step 404 for the initial iteration, the center frame of each group can be chosed to be the reference frame.

In some examples, with this stratified resampling approach enabled by the virtual exposures, motion can be compensated at the level of individual photon arrivals to create high-fidelity aggregate frames, which in turn can be used to further refine the motion estimates. Virtual exposures are created by re-sampling the photon-cube post-capture, allowing arbitrary, fluid, and even overlapping exposures, enabling us to resolve higher speed motion.

Figure 5A:
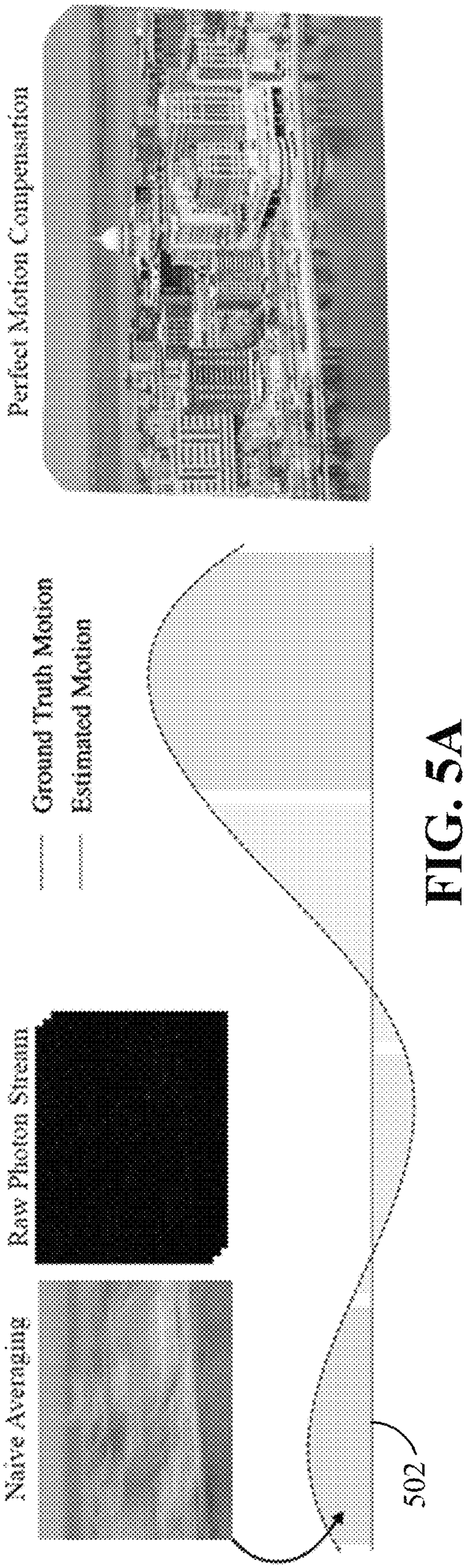
FIGS. 5A-5D illustrate example motion estimation using stratified temporal re-sampling according to some embodiments.
Figure 5B:
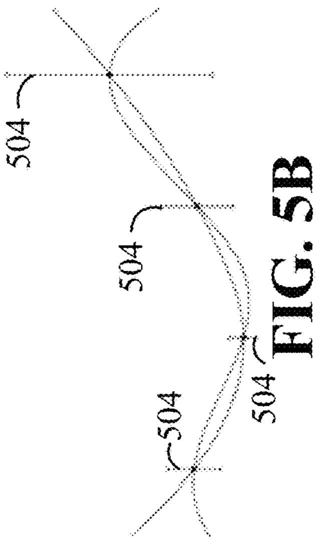
Figure 5C:
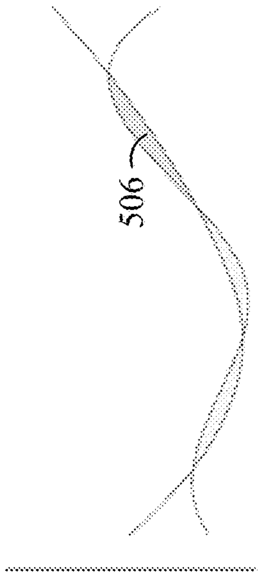

An abstract example of the temporal resampling is illustrated in FIGS. 5A-5D. In FIG. 5A, a motion estimate from the raw photon data might not be recovered as the raw photon data is binary-valued, noisy, and nondifferentiable. In some examples, an initial set 502 of virtual exposures can be simply aggregate frames with no motion compensation akin to a sequence of short exposures from a conventional camera. In FIG. 5B, the blur causes the registration algorithm to produce noisy motion estimates 504 from which the estimated motion trajectory is updated. Thus, a coarse motion trajectory can be estimated using a motion model (e.g., an off-the-shelf motion model, etc.). In FIG. 5C, with this new trajectory, the differences 506 between the ground truth motion and the estimated motion is smaller than those in FIG. 5A, leading to higher-quality virtual exposures. In some examples, new virtual exposures can be sampled as needed, and new frames centered around the midpoints of previous frames. Although potentially erroneous estimates can be produced, these motion estimates in the iterative approach can be used to spatiotemporally warp the underlying photon data and re-combine it into less blurry images.

Figure 5D:
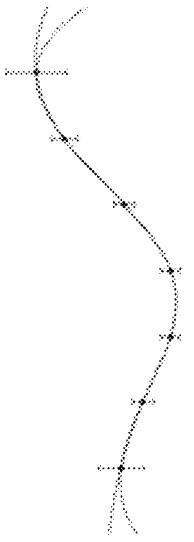

FIG. 5D shows that the error bars on existing points get smaller in the second iteration. This is repeated to create additional virtual exposures until convergence, resulting in improved motion estimates. The iterative method has an asymptotic runtime of O (n/m), providing significant speedup over other alternative approaches (e.g., a sliding-window approach).

This stratified re-sampling approach can deal with the motion blur and noise tradeoff. The number of frames (m) per group can deal with this tradeoff: a larger value of m helps counteract Poisson noise but also causes motion blur. In some examples, if SPAD binary frames are available at ~100 kHz, setting m≈250-750 can achieve high-quality results across different motion speeds and light levels, with higher values better suited for extremely low light, and lower values for fast motion. See supplementary material for details on the asymptotic behavior of this grouping policy, and the impact of the choice of the reference frame for each group.

At step 406, the process 400 merges multiple first frames in a first group and multiple second frames in a second group to generate a first merged frame and a second merged frame, respectively. In some examples, the first group and the second group can be included in the multiple initial groups. In some examples, the process 400 can warp the first merged frame and the second merged frame to be aligned together before determining the homography across the first merged frame and the second merged frame or before merging the multiple first and second frames. In further examples, the frames within each group can be warped and merged. For example, the process 400 can select a first middle frame in the first group and a second middle frame in the second group. In some examples, the first middle frame is a frame at the center of the first group when multiple frames are placed in time sequence in the first group. In some examples, when there are N frames (e.g., frame 1, frame 2, . . . frame N) in the first group, the first middle frame is a frame placed at N/2 or N/2+1. For example, when there are 500 frames in the first group, the first middle frame can be frame 250 or frame 251. In other examples, when there are 501 frames in the first group, the first middle frame can be frame 251. The second middle frame is similar to the first middle frame. In some examples, the process 400 can warp the multiple first frames in the first group and the multiple second frames based on the first middle frame and the second middle frame. Thus, the objects in the multiple first and second frames can be aligned to the object in the first and second middle frames, respectively. The warp operation is applied locally within each group. By applying these warps locally with respect to the group's center frame (instead of a global reference frame), the frames within each group can be warped by small amounts.

In some examples, the process 400 can merge the multiple first frames and the multiple second frames to generate the first merged frame and the second merged frame, respectively. For example, the warped frames are then merged using Eq. (3). In some examples, the warped frames can be tone-mapped to sRGB. For example, the three sRGB components can have the same values to show a grayscale image in the merged frame. In other examples, the three sRGB components can have the different values to show color. In further examples, the tone-mapping can be applied independently of whether or not the image is in color. The tone-mapping can be a way to adjust the image intensities (whether color or grayscale) so that images look pleasing to human eyes. In some examples, the tonemapping can be a post-processing step that can be performed on-chip.

At step 408, the process 400 can determine a homography across the first merged frame and the second merged frame. In some examples, the process 400 can estimate homography (e.g., warp) for each pair of merged frames. For example, for two merged frames, the process 400 can estimate one homography relating the two merged frames. When the process 400 produces N merged frames, the process 400 can estimate N−1. In some examples, the pairwise warps between merged frames are estimated using an off-the-shelf method. Any drift introduced in this step is corrected during subsequent iterations. In some examples, the homography can include a 3×3 matrix, and the 3×3 matrix can be defined by:

$$H = \begin{bmatrix} 1+p_1 & p_3 & p_5 \\ p_2 & 1+p_4 & p_6 \\ p_7 & p_8 & 1 \end{bmatrix},$$

where p1, p2, p3, p4, p5, p6, p7, and p8 are homography parameters determined by the first merged frame and the second merged frame. In some examples, the process 400 can establish a warp between the merged frames. Once the relative warp between merged frames is established, the process 400 can decide on a global reference frame on which to project all frames to. The global frame can be a center frame of the set of frames or any suitable frame in the set of frames. Generally, the choice of the global frame can be a matter of picking which frame will not get warped (or equivalently will be warped by the identity warp).

At step 410, the process 400 can interpolate the homography to generate a warp to warp the set of frames. In some examples, the process 400 can interpolate the estimated homography matrices across time to get the fine-scale warps later used to warp individual binary frames. For example, to interpolate the homography, the process 400 can interpolate the homography parameters (e.g., $p_1$, $p_2$, $p_3$, $p_4$, $p_5$, $p_6$, $p_7$, $p_8$) of the 3×3 matrix. In some examples, the process 400 can use a geodesic interpolation to interpolate homographies. In other examples, In practice, the process 400 can use an extended Lucas-Kanade formulation to interpolate homographies to avoid computing matrix inverses and be numerically more stable. The resulting interpolated homographies are able to resolve extremely high-speed motion at the granularity of individual binary frames (~100 kHz), thus significantly mitigating the noise-blur tradeoff. In some examples, the process 400 can interpolate between the homographies, which are obtained from step 408 (i.e., the locating step) and are obtained from pairwise merged frames. In such examples, interpolating between the homographies, which are obtained from each pair of merged frames, can include estimating a homography for each frame of the set of frames. After interpolation, the process 400 can produce a unique homography per binary frame to warp all binary frames. These warped binary frames can be then grouped together and re-merged. Since each binary frame was warped, the new merged frames (created from binary frames which have been warped with the latest and best estimate of their true homography) can be less blurry/noisy thus allowing even better subsequent localization. This process is repeated as shown in step 412 below until the reconstruction quality of image (e.g., which is improved, satisfied, or higher than a reconstruction quality threshold) is produced At step 412, the process 400 can determine to repeat the sub-process of the resampling of step 414, merging of step 406, the determining of the homography of step 408, and the interpolating of step 410. If the process 400 determines to repeat the sub-process, the process 400 can perform steps 414, 406, 408, and 410. If the process 400 does not determine to repeat the sub-process, the process 400 can perform step 416.

At step 414, when the process 400 determines the repeat, the process 400 can resample the set of frames to generate multiple new groups. The multiple new groups include a first new group corresponding to the first initial group and a second new group corresponding to the second initial group. In some examples, in subsequent iterations, the binary frame sequence (i.e., the set of frames) can be re-sampled to create new groups including m frames that are chosen such that they are centered between the previous iteration's groups. This introduces overlapping groups and ensures a progressively denser sampling of the motion trajectory. For example, in the initial grouping of step 404, the process 400 can group n frames into multiple groups where each group includes m frames. The initial groups can be n/m non-overlapping groups. In the second iteration, the process 400 can resample the set of frames (e.g., n frames) to generate new groups. Each new group can include m frames, which are centered between two consecutive new groups. In other examples, frames of a new group are centered around the midpoint of a group before the iteration. In some examples, all binary frames can be warped with interpolated homographies before each merged operation at step 406. In some examples, the group size m can stay constant. In some examples, two groups can overlap each other. For example, if groups in the first iteration are of size m and start every m frames (i.e: [0, m), [m, 2m), [2m, 3m), etc.], groups in the second iteration can overlap by m/2 (i.e: [0, m), [m/2, m+m/2), [m, 2m), [m+m/2, 2m+m/2), etc After the resampling of the set of frames, the process 400 can further merge multiple third frames in the first new group and multiple fourth frames in the second new group to generate a third merged frame and a fourth merged frame, respectively, determine a second homography across the third merged frame and the fourth merged frame, and interpolate the second homography to generate a warp to warp the set of frames. In some examples, the process 400 can repeat steps 414 (the resampling step), 406 (the merging step), 408 (the homography determining step), and 410 (the interpolating step).

Figure 3C:
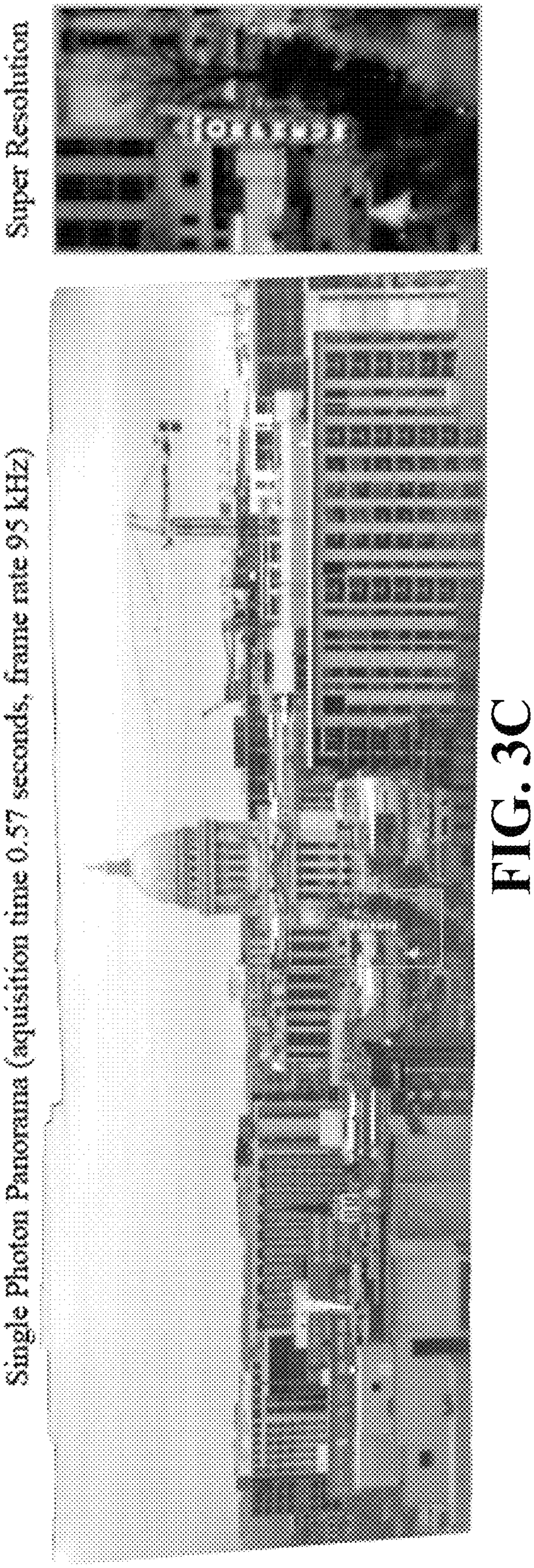

At step 416, when the process 400 determines not to repeat, the process 400 can provide a reconstructed image based on the warp of the set of frames. In some examples as shown in FIG. 3C, the reconstructed image comprises a panorama for the scene captured by the set of frames.

EXPERIMENTS

The disclosed technique was demonstrated in simulation and through real-world experiments using a SPAD hardware prototype.

Simulation Details: A SPAD array capturing a panoramic scene was simulated by starting with high-resolution panoramic images downloaded from the internet. Camera trajectories were created across the scene such that the SPAD's field of view (FOV) sees only a small portion of the panorama at a time. At each time instant of the trajectory, a binary frame from the FOV of the ground truth image was simulated by first undoing the sRGB tone mapping to obtain linear intensity estimates, and then Eq. (2) is applied to simulate the binary photon stream. RGB images were simulated by averaging the ground truth linear intensities over a certain exposure and adding Gaussian noise.

Hardware Prototype: For experiments, the SwissSPAD was used to capture binary frames (FIG. 3A). The sensor has a usable resolution of 254×496 pixels. It does not have micro-lenses, or a color filter array, and the fill factor is 10.5% with 16.8 μm pixel pitch. Despite these limitations, it is capable of capturing binary frames at 100 KHz.

Implementation Details: The implementation took on the order of ten minutes, per iteration, to process 100k frames. While factors such as resolution and window size (m) affect runtime, the implementation is throttled by the underlying registration algorithm which recomputes features at every level. Further optimizations and feature caching can improve runtime.

Figures 6A, 6B, 6C:
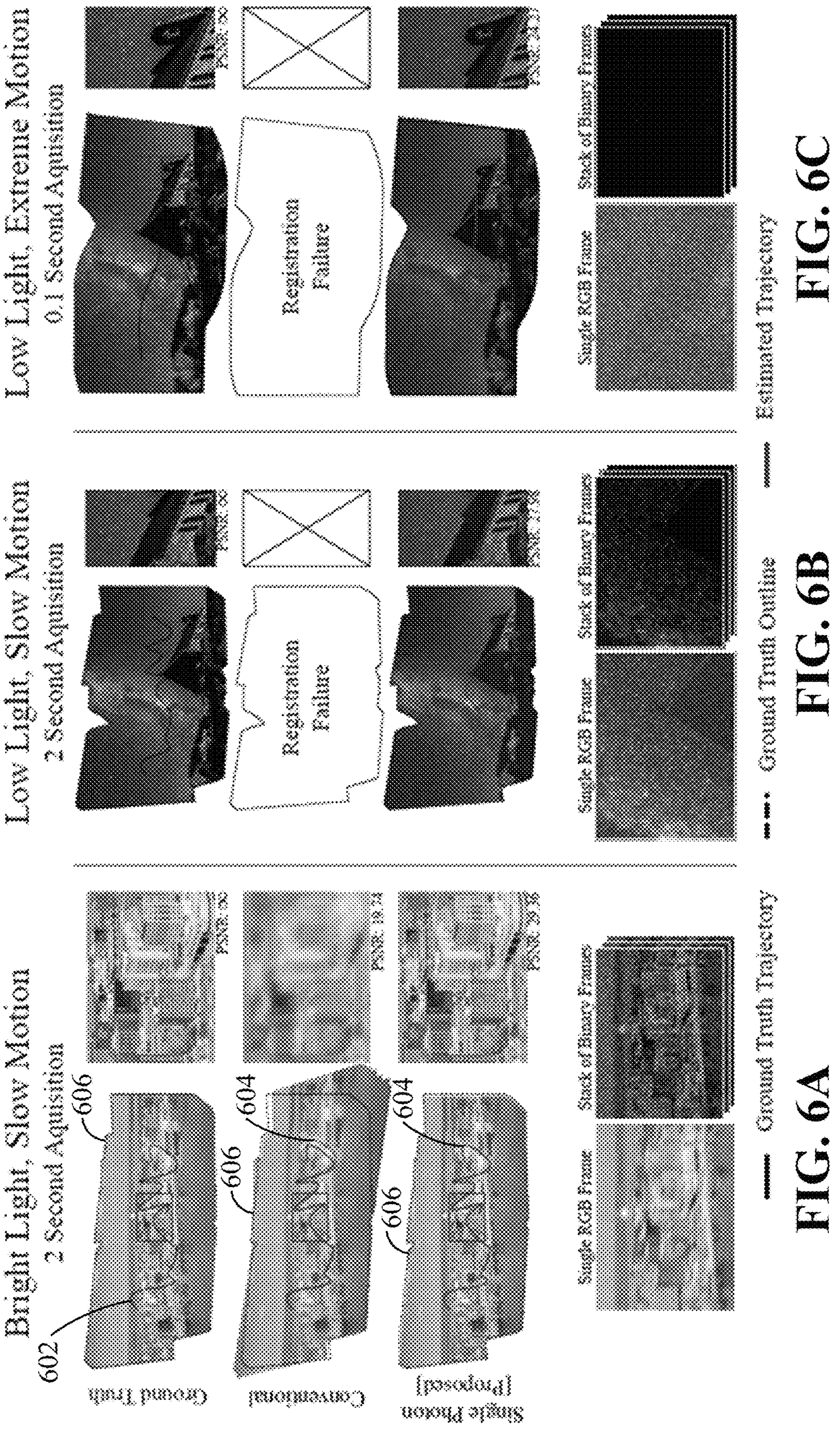
FIGS. 6A-6C illustrate example simulated panoramas according to some embodiments.

Fast Motion Recovery: FIG. 6A shows an example panorama reconstruction in a challenging scenario where the camera moves along an arbitrary trajectory across the full FOV. Conventional panorama reconstruction techniques fail, even if there is sufficient light in the scene, because individual frames suffer from extreme motion blur, making it difficult to find reliable feature matches. By iteratively creating staggered virtual exposures, the example method (e.g., process 400 in FIG. 4) can resolve motion that would otherwise be entirely contained within a single exposure of a conventional camera image. The example approach is capable of recovering a near-perfect motion trajectory, which, as seen in the zoomed-in crops, further enables high-fidelity scene reconstruction.

Low Light Robustness: FIG. 6B shows the challenging scenario where the camera pans across a dark scene. Here, the conventional RGB method fails because no matches are found in the extremely noisy RGB frames. The situation gets worse in FIG. 6C where low light is accompanied by extremely fast camera motion. In this extremely low flux regime, the RGB image is dominated by read noise and causes feature registration to fail. In contrast, our approach produces high-quality reconstructions.

Figure 7:
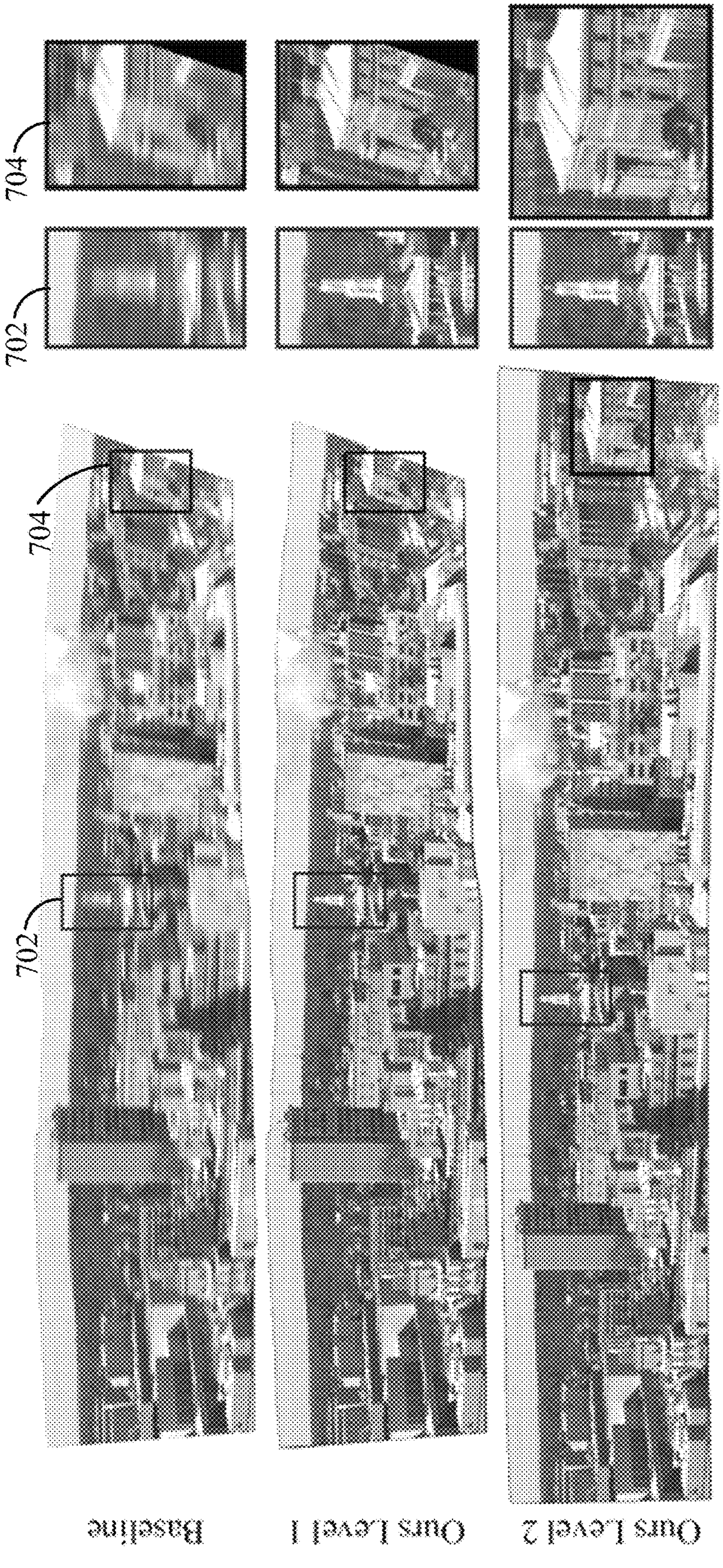
FIG. 7 illustrates an example multi-level refinement of panorama according to some embodiments.

Globally Consistent Matching: An issue when global motion is estimated piece by piece is that of drift: any error in the pairwise registration process accumulates over time. This phenomenon is clearly visible in the RGB panorama in FIG. 6A—not only does the estimated motion trajectory 604 drift away from the ground truth 602, but the panorama gets stretched as compared to the ground truth panorama outline 606. This drift gets corrected with the proposed method due to the iterative refinement of both the motion estimate and the resulting reconstruction. FIG. 7 demonstrates such iterative refinement using real SPAD captures with our hardware prototype. In FIG. 7, a panorama created by naively averaging adjacent frames are shown, in groups of 1000 (baseline), and two iterations of the example method also using a group size of m=1000 (1 and 2). Blurrier regions such as the tower 702 become sharper and the building 704 is reconstructed without distortion after only two iterations. As the number of iterations is increased, the global shape of the panorama gets rectified. The progressive improvement of individual aggregate frames is shown in FIG. 3B.

Figure 8:
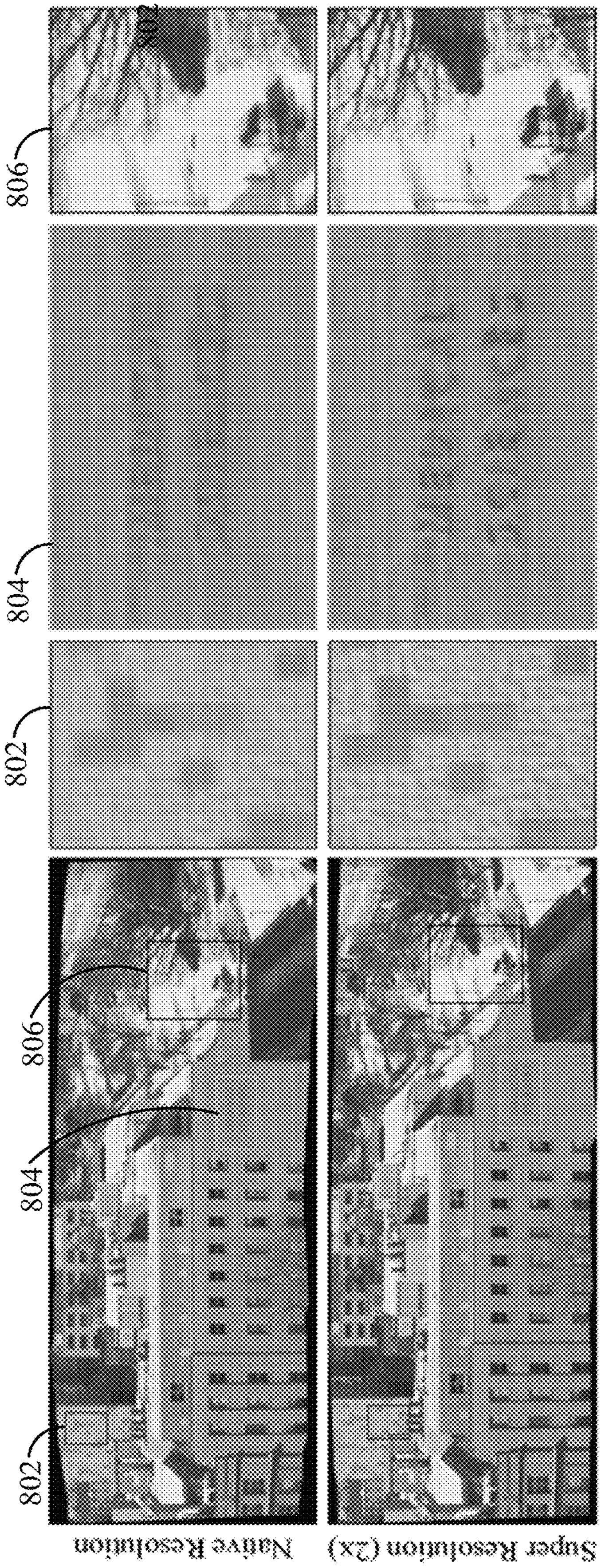
FIG. 8 illustrates a super-resolution example according to some embodiments.

Super-Resolution and Efficient Registration: Due to dense temporal sampling, and the resulting fine-grained homography estimates, the example method enables super-resolution in the reconstructed panoramas. This is achieved by applying a scaling transform to the estimated homographies before the merging step. This scaling transform stretches the grid of pixels into a larger grid, resulting in super-resolution. Further, to save on compute and memory costs, this scaling factor can be gradually introduced across iterations. For example, if the goal is to super-resolve by a scale of 4×, the estimated warps can be scaled by a factor of two over two iterations. It is also possible to use scaling factors that are smaller than one in the initial iterations of the pipeline. This can be done to create large-scale panoramas, such as the one in FIG. 3C, while maintaining low computational and memory footprints. An experimental result with sub-pixel registration is shown in FIG. 8. In FIG. 8, by interpolating homographies over additional virtual exposures, the example method can super-resolve the sensor's native resolution (254×496) by 2×. Details such as text on the building 802, 804 and finer structures such as tree branches 806 are super-resolved.

Figure 9:
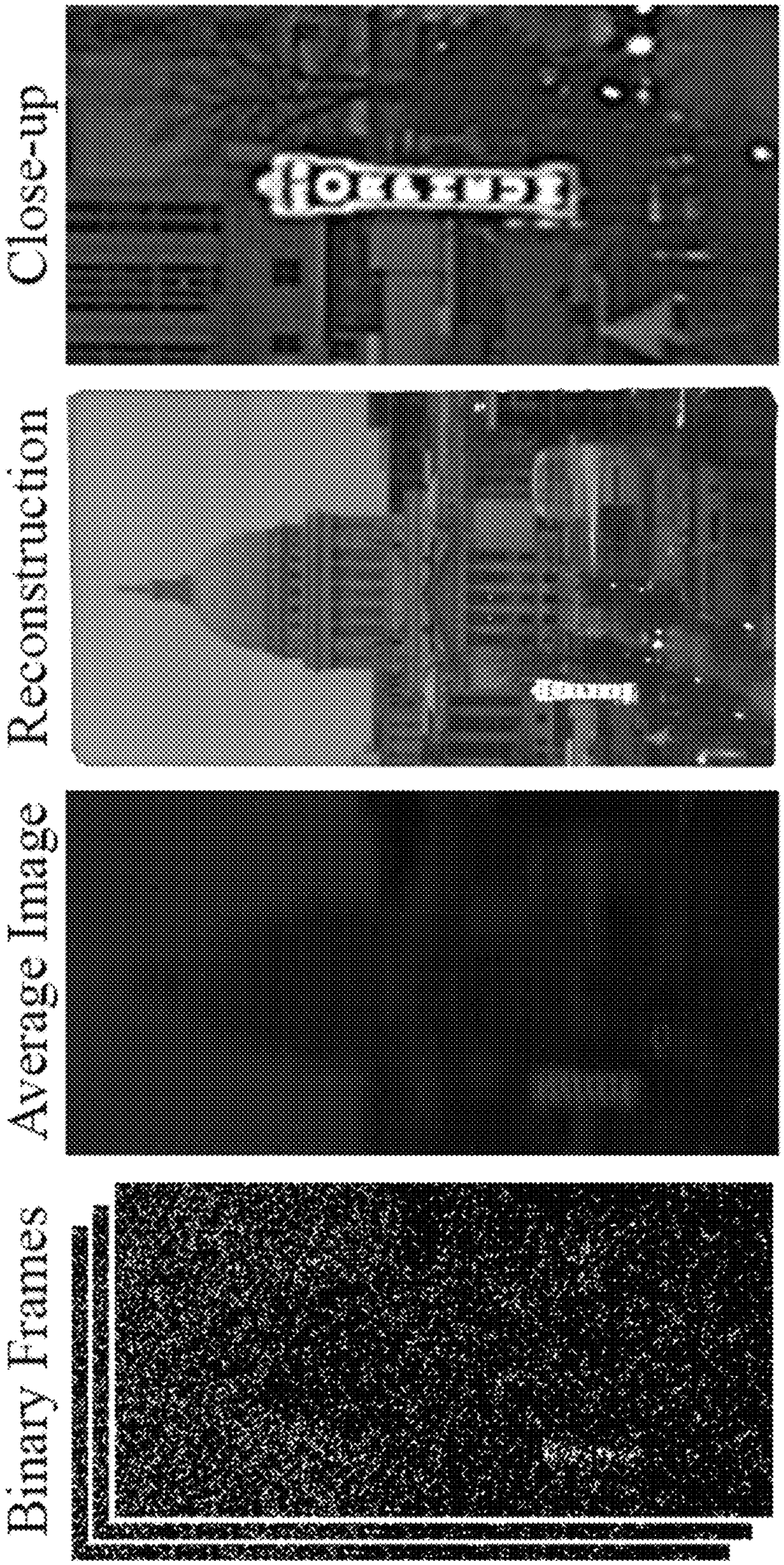
FIG. 9 illustrates a high dynamic range image stabilization example according to some embodiments.

High Dynamic Range: Single photon cameras have recently been demonstrated to have high dynamic range (HDR) capabilities. By performing high-accuracy homography estimation and registration, the example method can merge a large number of binary measurements from a given scene point, thus achieving HDR. FIG. 9 shows a real-world example of HDR on a sequence of binary frames captured at night. In FIG. 9, by aligning a large number of extremely dark binary frames, the high-frequency camera shake which causes the average image can be stabilized to be washed out, and the night-time scene can be reconstructed with recovered detail in both the dark and bright regions.

Extension to High-Speed Cameras: The stratified re-sampling approach can be extended to other high-speed imaging modalities that allow fast sampling. For example, a conventional high-speed camera can be used for the stratified re-sampling approach.

FURTHER EXAMPLES

Edge Effects and Pre-warping: When an off-the-shelf homography estimation algorithm is used over a virtual exposure of duration t, with respect to which time instant within the exposure duration will the estimated localization be? This is not an issue for small camera movements, but with fast motion, this ambiguity has a compounding effect. A sensible assumption would be to presume that the base model estimates the average location over an exposure time, or perhaps, the location at the center of the exposure. This observation can indicate i) if some motion has been already compensated when creating the aggregate frame, the new estimate will be relative to it, and ii) it allows to localize with respect to any time instant during the exposure by warping the photon data, before aggregation, such that the time instant of interest is warped by the identity warp instead of the current motion estimate.

Figure 10B:
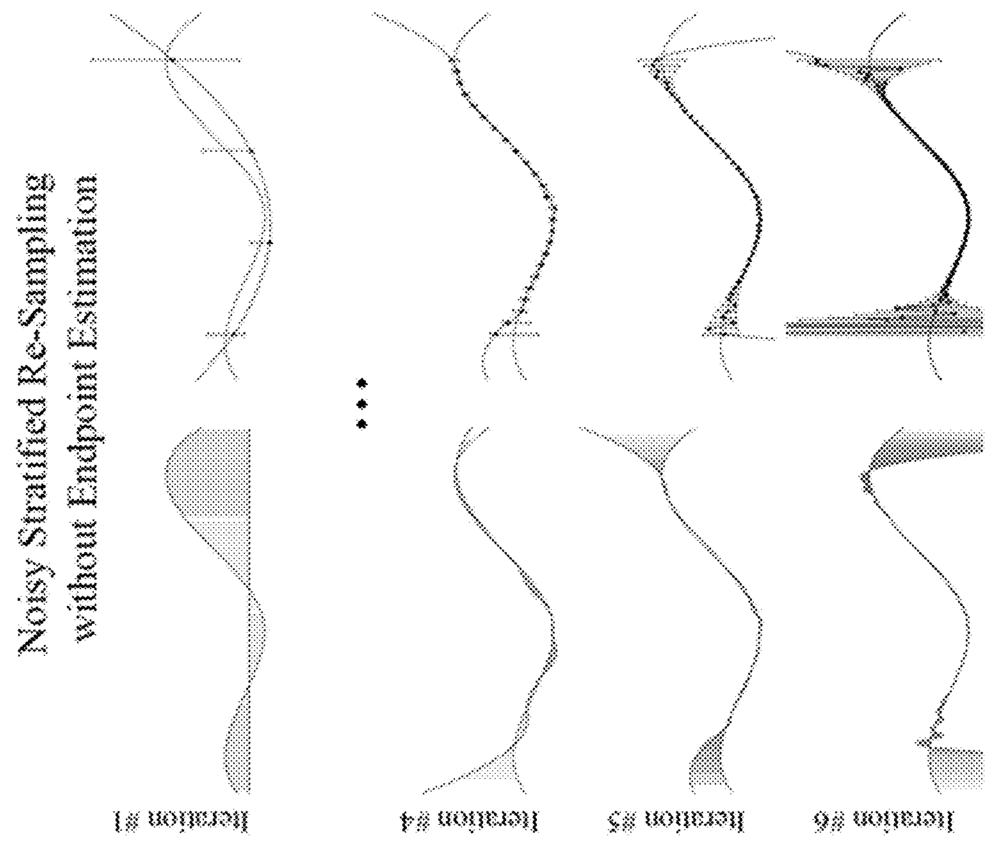
FIGS. 10A and 10B illustrates edge effects in stratified temporal re-sampling example according to some embodiments.
Figure 10A:
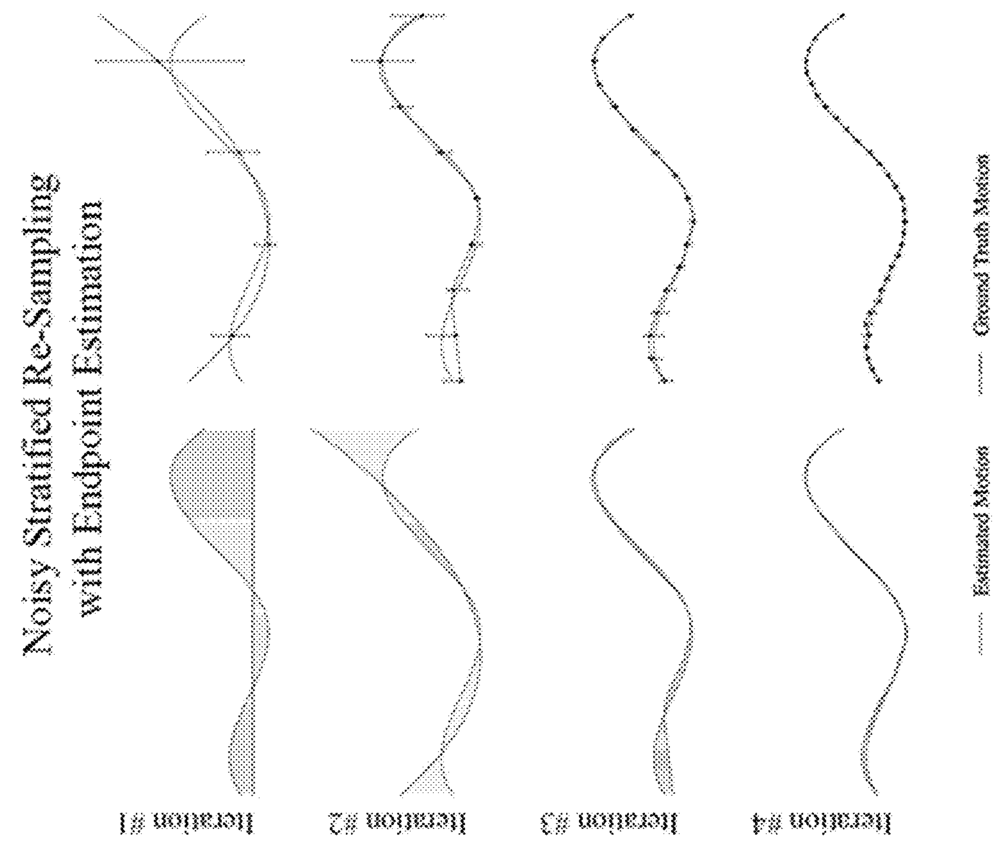

Without accounting for the former, any motion estimate would rapidly drift away. In practice, it is beneficial to compensate for this relative offset before aggregation and localization as it helps constrain the size of the aggregate frames and can lead to better matches. The latter enables the localization of off-center time slices of a virtual exposure, enabling precise localization at the boundaries of a captured sequence, which, as seen in FIG. 10A, is necessary for proper convergence of the motion estimate, and finer motion estimation. In FIG. 10A, the motion estimate provided by the underlying registration algorithm might be noisy (for simplicity, this noise was omitted in FIG. 10A. Despite this noise, the motion trajectory rapidly converges to the ground truth motion. In FIG. 10B, over the course of a few iterations, localization errors can accumulate at the ends of the trajectory if the endpoints of the trajectory are not estimated. In some examples, this phenomenon can be mitigated by either estimating boundary frames or stopping the iterative process before it occurs, as most sequences will converge to a satisfactory motion estimate in two or three iterations.

Figure 11B:
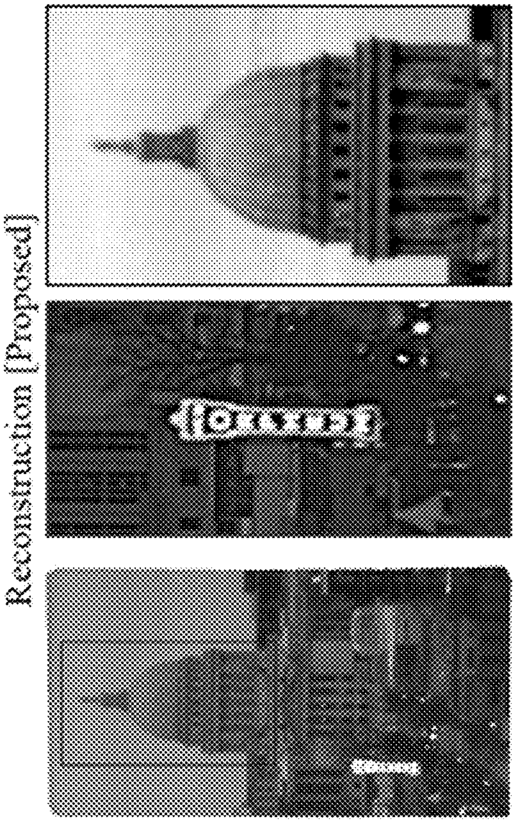
FIGS. 11A and 11B compare the proposed method with Quanta burst photography.
Figure 11A:
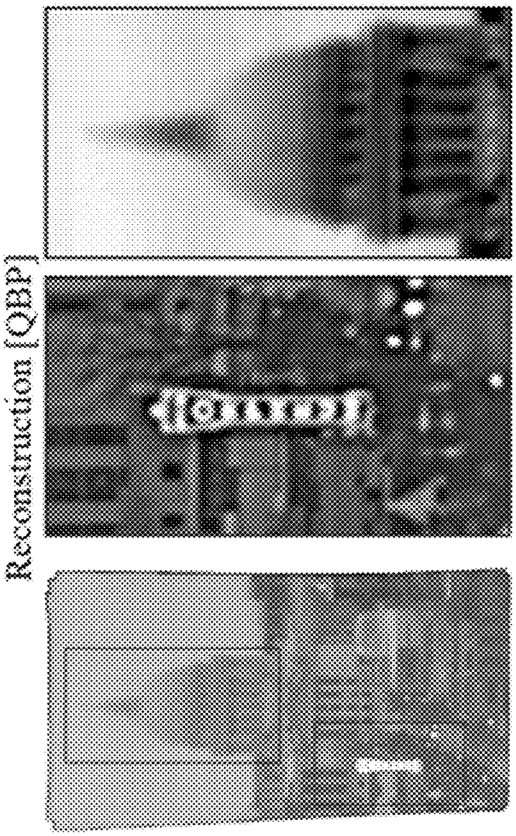

Comparison with One-Shot Motion Compensation Methods: Quanta burst photography (QBP) is a recently proposed algorithm that uses a more general optical flow-based motion model that locally warps and registers groups of binary frames. A comparison with our method is shown in FIGS. 11A and 11B. In FIGS. 11A and 11B, the raw photon data was first processed using QBP and then assembled into the reconstruction shown here using traditional stitching methods. As shown in FIG. 11A, QBP cannot fully compensate for the high-frequency camera vibrations causing the reconstruction to be blurry. The QBP image is generated by first creating motion-compensated frames from groups of m=1000 binary frames. These frames are then assembled into the final reconstruction by using a traditional homography estimation technique. This implementation makes a single pass over the binary frames. In contrast, the example method assumes a planar motion model and uses two iterations to re-estimate the homography warps used for aligning and merging the raw binary frames. This provides sharper scene details such as the text and smaller features near the top of the dome as shown in FIG. 11B. The stratified method disclosed herein allows motion to be estimated and refined over multiple iterations, which makes direct comparison with existing techniques difficult.

Using Conventional High-Speed Cameras: The iterative stratified motion estimation and alignment method presented above is not restricted to single-photon cameras and can be applied to images captured by a high-speed camera as well. The only assumption is that individual frames obtained from the high speed camera contain minimal motion blur and are high enough SNR to allow frame-to-frame feature matching.

Figure 12A:
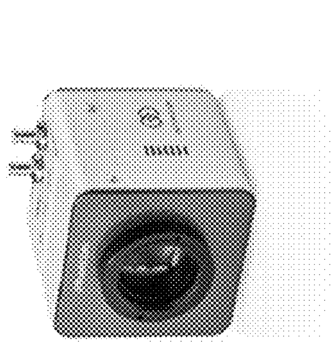
FIGS. 12A-12D illustrates the proposed method using conventional high-speed cameras according to some embodiments.
Figure 12B:
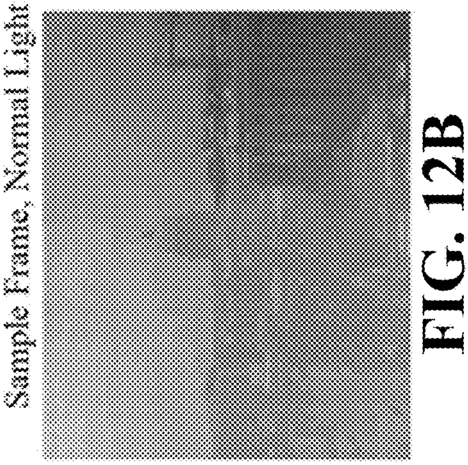

We demonstrate this using a commercially available high-speed camera (e.g., Photron Infinicam shown in FIG. 12A). This camera captures ~1000 fps at its full resolution of 1246×1024, with higher frame rates available for lower resolutions. All frames are compressed on the camera and access to raw frames is not possible. If the scene is too dark all useful information will be corrupted by compression artifacts, further impeding the creation of virtual exposures as compression and frame aggregation do not commute. This phenomenon can be seen in FIG. 12B, it occurs when using the same optical setup as the one used with our SPAD prototype (75 mm focal length, f/5.6), even with a much longer exposure time (which corresponds to 500 fps). As shown in FIG. 12B, individual image frames from the commercial high-speed camera are extremely noisy and show compression artifacts even when capturing frames at ~2× slower motion and running at 500 fps. Panorama reconstruction using such frames fails due to lack of reliable feature matches across frames.

Figure 12C:
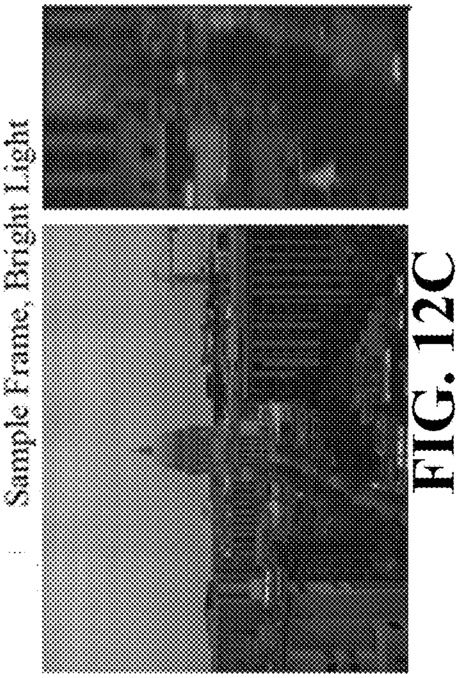
Figure 12D:
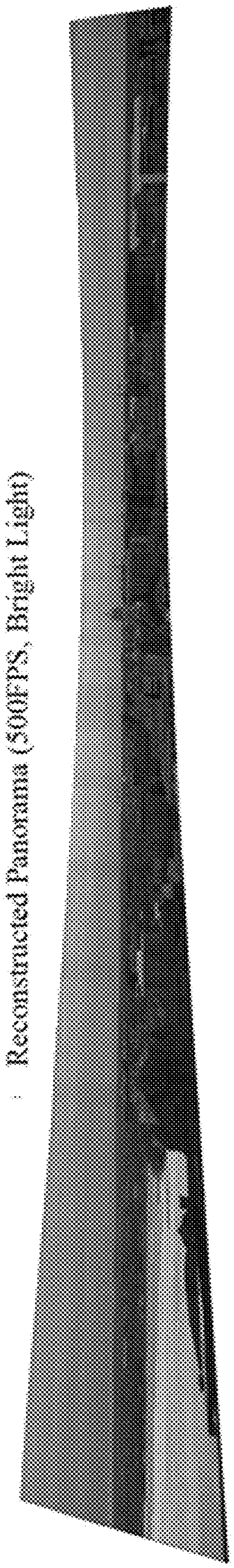

To get sufficient signal to overcome these limitations we increased the aperture to allow the camera to capture 4× more light. FIG. 12C shows a sample frame captured at 500 fps with this new setup. Despite the slower motion (~2× slower than seen in FIG. 3C) and the much larger resolution of the Infinicam, scene details such as text appear blurred. These frames can be assembled into a larger panorama using our algorithm (FIG. 12C).

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method for scene reconstruction, comprising:

obtaining a set of frames for a scene;

grouping the set of frames into a first initial group and a second initial group;

determining a first homography across a first merged frame of the first initial group and a second merged frame of the second initial group;

warping the set of frames according to the first homography;

resampling the warped frames to generate a first new group;

determining a second homography across a third merged frame of the first new group and a fourth merged frame;

warping the set of warped frames according to the second homography; and providing a reconstructed image based on the warp of the set of frames.

2. The method of claim 1, wherein the set of frames is captured by a single-photon camera or a high-speed camera.

3. The method of claim 2, wherein a number of frames in each of the first initial group and the second initial group is between 250 and 750.

4. The method of claim 1, further comprising:

merging a plurality of first frames of the first initial group to generate the first merged frame; and merging a plurality of second frames of the second initial group to generate the second merged frame.

5. The method of claim 4, further comprising:

selecting a first middle frame in the first initial group and a second middle frame in the second initial group, wherein the first middle frame is in a middle of the first initial group, and wherein the second middle frame is in a middle of the second initial group, wherein the merging of the plurality of first frames comprises:

warping the plurality of first frames in the first initial group based on the first middle frame; and merging the plurality of first frames to generate the first merged frame;

wherein the merging of the plurality of second frames comprises:

warping the plurality of second frames in the second initial group based on the second middle frame; and merging the plurality of second frames to generate the second merged frame.

6. The method of claim 1, wherein the first initial group includes a first subset of frames of the set of frames, and the second initial group includes a second subset of frames of the set of frames, wherein the method further comprises:

warping the first subset of frames based on the first homography;

merging the first subset of warped frames to generate a new first merged frame;

determining a first new homography across the first merged frame and the third merged frame; and warping the set of warped frames according to the first new homography and the second homography.

7. The method of claim 1, wherein the first homography comprises a 3×3 matrix, and wherein the 3×3 matrix is defined by:

$$H = \begin{bmatrix} 1+p_1 & p_3 & p_5 \\ p_2 & 1+p_4 & p_6 \\ p_7 & p_8 & 1 \end{bmatrix},$$

where $p_1$, $p_2$, $p_3$, $p_4$, $p_5$, $p_6$, $p_7$, and $p_8$ are homography parameters determined by the first merged frame and the second merged frame.

8. The method of claim 1, wherein the warping of the set of frames according to the first homography comprises:

interpolating the first homography across the first initial group and the second initial group; and warping the set of frames based on the interpolation of the first homography.

9. The method of claim 1, wherein the first new group comprises a first plurality of warped frames from the first initial group and a second plurality of warped frames from the second initial group.

10. The method of claim 1, further comprising:

repeating the resampling of the set of frames, the determining of the second homography across the third merged frame and the fourth merged frame, and the warping of the set of frames.

11. The method of claim 1, wherein the reconstructed image comprises a panorama for the scene captured by the set of frames.

12. A system for scene reconstruction, comprising:

a memory; and a processor communicatively coupled to the memory, wherein the memory stores a set of instructions which, when executed by the processor, cause the processor to:

obtain a set of frames for a scene;

group the set of frames into a first initial group and a second initial group;

merge a plurality of first frames in the first initial group and a plurality of second frames in the second initial group to generate a first merged frame and a second merged frame, respectively;

determine a first homography across the first merged frame and the second merged frame;

warp the set of frames according to the first homography;

resample the set of warped frames to generate a first new group;

merge a plurality of third frames in the first new group to generate a third merged frame;

determine a second homography across the third merged frame and a fourth merged frame;

warp the set of warped framed according to the second homography; and provide a reconstructed image based on the warp of the set of frames.

13. The system of claim 12, wherein the memory stores the set of instructions which, when executed by the processor, cause the processor further to:

select a first middle frame in the first initial group;

warp the plurality of first frames based on the first middle frame;

select a second middle frame in the second initial group; and warp the plurality of first frames based on the first middle frame, wherein the first middle frame is in a middle of the first initial group, and wherein the second middle frame is in a middle of the second initial group.

14. The system of claim 12, wherein the memory stores the set of instructions which, when executed by the processor, cause the processor further to:

warp the frames of the first initial group and frames of the second initial group before determining the second homography across the third merged frame and the fourth merged frame; and merging at least a portion of warped frames of the first initial group to generate the fourth merged frame.

15. The system of claim 12, wherein the first homography comprises a 3×3 matrix, and wherein the 3×3 matrix is defined by:

$$H = \begin{bmatrix} 1+p_1 & p_3 & p_5 \\ p_2 & 1+p_4 & p_6 \\ p_7 & p_8 & 1 \end{bmatrix},$$

where $p_1$, $p_2$, $p_3$, $p_4$, $p_5$, $p_6$, $p_7$, and $p_8$ are homography parameters determined by the first merged frame and the second merged frame.

16. The system of claim 12, wherein to warp the set of frames according to the first homography, the memory stores the set of instructions which, when executed by the processor, cause the processor to:

interpolate the first homography across the first initial group and the second initial group; and warp the set of frames based on the interpolation of the first homography.

17. A method for scene reconstruction, comprising:

(a) obtaining a sequence of frames of a scene, wherein each frame in the sequence of frames is associated with a different time;

(b) selecting, from the sequence of frames, a plurality of groups of frames each corresponding to a respective period of time in the sequence of frames, the plurality of groups of frames including at least: a first group of frames corresponding to a first period of time, a second group of frames corresponding to a second period of time, and a third group of frames corresponding to a third period of time;

(c) generating a plurality of merged frames, including a first merged frame based on the first group of frames, a second merged frame based on the second group of frames, and a third merged frame based on the third group of frames;

(d) determining a first homography between the first merged frame and the second merged frame;

(e) determining a second homography between the second merged frame and the third merged frame;

(f) warping frames of the first group of frames based on the first homography and warping frames of the third group of frames based on the second homography;

(g) selecting a fourth group of frames from the sequence of frames corresponding to a fourth period of time, wherein the fourth group of frames includes at least one frame warped at (f) and the fourth period of time overlaps with one or more time periods associated with the with the plurality of groups of frames;

(h) generating a second plurality of merged frames, including a fourth merged frame based on the fourth group of frames and a fifth merged frame;

(i) determining a third homography between the fourth merged frame and the fifth merged frame;

(j) warping frames of the fourth group of frames based on the third homography; and (k) providing reconstructed image data based the warped sequence of frames.

18. The method of claim 17, wherein (f) further comprises warping frames of the second group of frames based on the first homography and the second homography.

19. The method of claim 17, wherein the fifth merged frame is based on the warped first group of frames and represents the scene during the first period of time, and the fourth merged frame represents the scene during a portion of the first period of time and a portion of the second period of time.

20. The method of claim 17, further comprising:

prior to generating reconstructed image data at (k), repeating (g) to (j) at least one time, and with each repetition, selecting a new group of frames as the fourth group of frames at (g), generating a new second plurality of merged frames that includes more merged frames than were generated during the previous iteration at (h), and determining a new third homography at (i).

* * * * *